US 011206818B2

(12) United States Patent
Ting

(10) Patent No.: US 11,206,818 B2
(45) Date of Patent: Dec. 28, 2021

(54) MULTIFUNCTIONAL SUBMERSIBLE PUMP

(71) Applicant: Shao-Chieh Ting, New Taipei (TW)

(72) Inventor: Shao-Chieh Ting, New Taipei (TW)

( * ) Notice: Subject to any disclaimer, the term of this patent is extended or adjusted under 35 U.S.C. 154(b) by 239 days.

(21) Appl. No.: 16/296,183

(22) Filed: Mar. 7, 2019

(65) Prior Publication Data

US 2020/0196580 A1 Jun. 25, 2020

(30) Foreign Application Priority Data

Dec. 22, 2018 (TW) .................................. 107146671

(51) Int. Cl.
| | | |
|---|---|---|
| *A01K 63/04* | (2006.01) | |
| *E03B 11/00* | (2006.01) | |
| *A01K 63/00* | (2017.01) | |

(52) U.S. Cl.
CPC ............ *A01K 63/047* (2013.01); *E03B 11/00* (2013.01); *A01K 63/006* (2013.01)

(58) Field of Classification Search
CPC .... A01K 63/047; A01K 63/006; A01K 63/04; A01K 63/06
See application file for complete search history.

(56) References Cited

U.S. PATENT DOCUMENTS

| | | | | |
|---|---|---|---|---|
| 5,484,525 A | * | 1/1996 | Mowka, Jr. ............ | A01K 63/04 210/169 |
| 7,931,801 B2 | * | 4/2011 | Wang ..................... | A01K 63/04 210/167.23 |
| 9,445,580 B1 | * | 9/2016 | Smith .................... | A01K 61/00 |
| 2009/0139458 A1 | * | 6/2009 | Tsai ....................... | A01K 63/04 119/263 |
| 2016/0235043 A1 | * | 8/2016 | Sawicki ................ | A01K 63/04 |

* cited by examiner

*Primary Examiner* — Joshua J Michener
*Assistant Examiner* — Henry Hooper Mudd
(74) *Attorney, Agent, or Firm* — Michael D. Eisenberg

(57) ABSTRACT

The present invention provides a multifunctional submersible pump, which provides multiple functional selections suitable for various types of aquariums, including water circulation and filtering, pumping out wastewater, oxygenation, and carbon dioxide refining. The bottom portion of the submersible pump is provided with a water inlet, a water outlet, a wastewater drain outlet, and an adjustment knob. Left and right rotation of the adjustment knob enables water circulation and filtering or pumping out wastewater, as well as enabling adjusting the amount of water flow. One side of the top portion of the submersible pump is fitted with a retainer ring, which enables disposing an aquarium lamp therein. Another function of the present invention lies in the design of the simple assembly method of the $CO_2$ refiner, whereby the refiner can be easily disassembled for cleaning when a ceramic refining disk placed inside the refiner is obstructed by pollutants.

2 Claims, 11 Drawing Sheets

Scale
3:1

Scale
1:2

Scale
1:2

Scale
1:2

Scale
1:2

MULTIFUNCTIONAL SUBMERSIBLE PUMP

CROSS REFERENCES TO RELATED APPLICATIONS

The present application claims priority from Taiwanese Patent Application Serial Number 107146671, filed Dec. 22, 2018, the disclosure of which is herby incorporated by reference herein in its entirety.

BACKGROUND OF THE INVENTION

(a) Field of the Invention

The present invention relates to a structure for a multifunctional submersible pump, and more particularly to the configuration of an adjustment knob on a water pump that provides the function to facilitate easy switching between water circulation and filtering and pumping out wastewater from an aquarium; moreover, the pump structure provides functional selections to enable increasing the oxygen or increase the CO2 (carbon dioxide) content in the aquarium water according to the needs of the aquarium.

(b) Description of the Prior Art

The pursuit of a more spiritual life is steadily on the increase along with the improvement in material life standards of people, and a lot of people are passionate about caring for aquatic animals and plants in an aquarium as a leisure activity. Nonetheless, in the fast paced living of modern life, how to raise and feed the aquatic animals in an easy and relaxed fashion has clearly become especially important. A submersible pump is a vital component of an aquarium, and is the key as to whether raising and feeding the aquatic animals can be done in an easy and relaxed fashion.

However, there are numerous submersible pumps of the prior art on the market, but the majority only have a single function and cannot satisfy the needs of various different types of aquariums. Moreover, the existing submersible pumps have poor water circulation and filtering effectiveness, and thus require frequent water replacement to ensure water quality, making them unsuitable for the more "lazy people".

Thus it can be seen that the above-described submersible pumps of the prior art still have shortcomings and in reality are not good designs, and thus in need of urgent improvement.

Hence, in light of the shortcomings derived from the aforementioned prior art, and the urgent need for improvement, after many years of painstaking efforts and meticulous study and exploration, the inventor of the present invention finally successfully developed a multifunctional submersible pump as disclosed herein.

SUMMARY OF THE INVENTION

The main object of the present invention lies in providing a multifunctional submersible pump, which comprises an upper cover, a pump body, an adjustment knob, a hollow pipe fixing column, a gasket ring, a lower cover, a simple CO2(carbon dioxide) refiner, and an oxygenation regulator.

Another object of the present invention lies improving the multifunctional submersible pump with the adjustment knob fitted on the pump body, whereby rotating thereof enables achieving the function to switch between water circulation and filtering or pumping out wastewater.

Yet another object of the present invention lies in, according to needs, mounting the simple CO2 refiner on the tail end of a water circulation and filtering water outlet provided on the pump body the multifunctional submersible pump.

Yet another object of the present invention lies in providing the multifunctional submersible pump with an assembly mounting method for the simple CO2 refiner, whereby, when a ceramic refining disk placed inside the simple CO2 refiner is obstructed by pollutants, the refiner can be easily disassembled for cleaning and maintenance.

Yet another object of the present invention lies in providing the multifunctional submersible pump with a water inlet, the end of which is connected to a bottom sand filter board placed in an aquarium through a rigid hollow pipe, which provides the functions to achieve water circulation filtering or pumping out wastewater from the aquarium.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

A detailed description of the technological means adopted to achieve the above-described objects and effects are provided below, which together with the drawings that show the preferred embodiments, structure, characteristics, and advantages of the present invention provide a clearer and easy understanding thereof.

Figure 1:
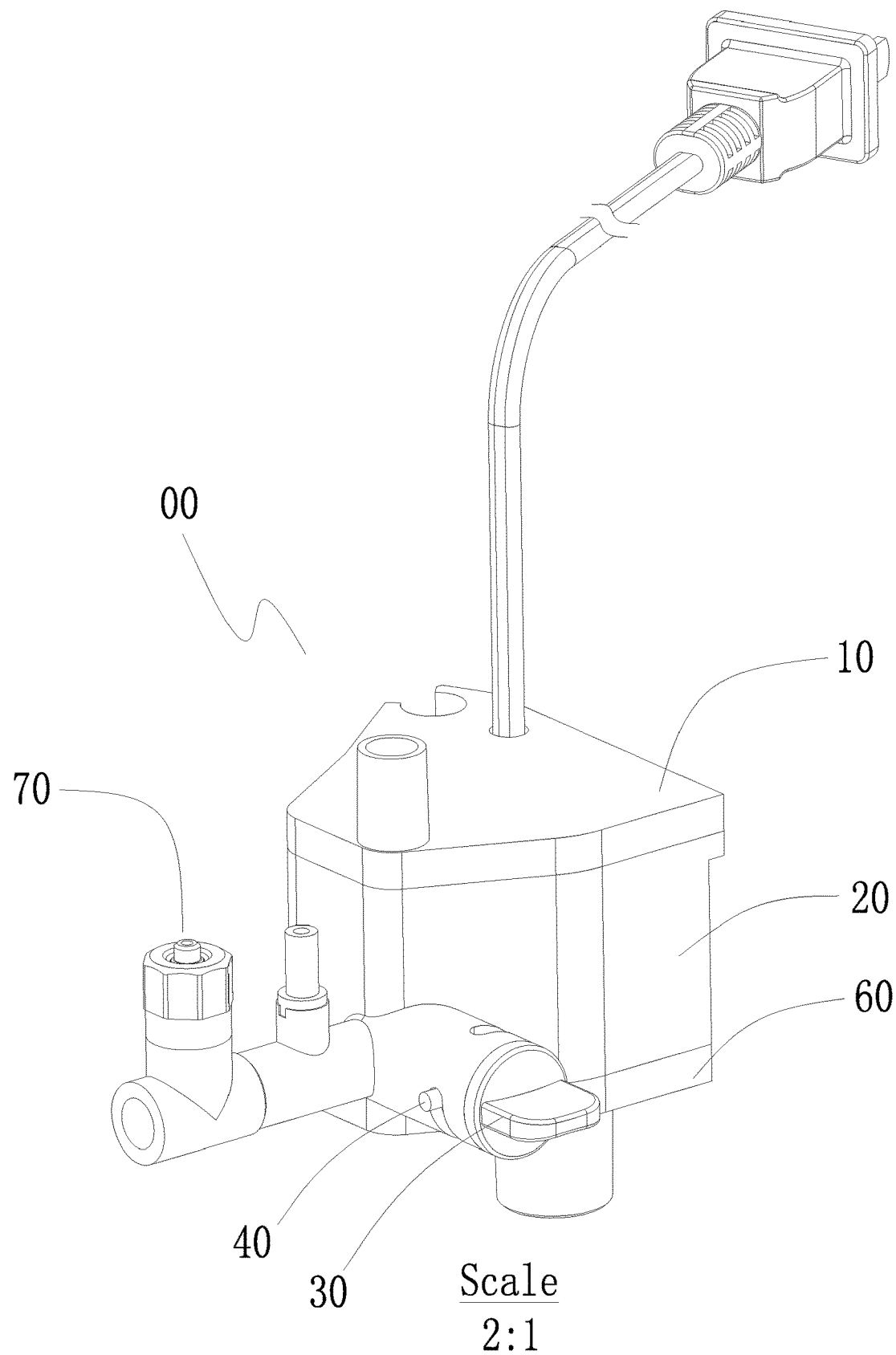
FIG. 1 is a three-dimensional schematic view of a multifunctional submersible pump of the present invention.
Figure 2:
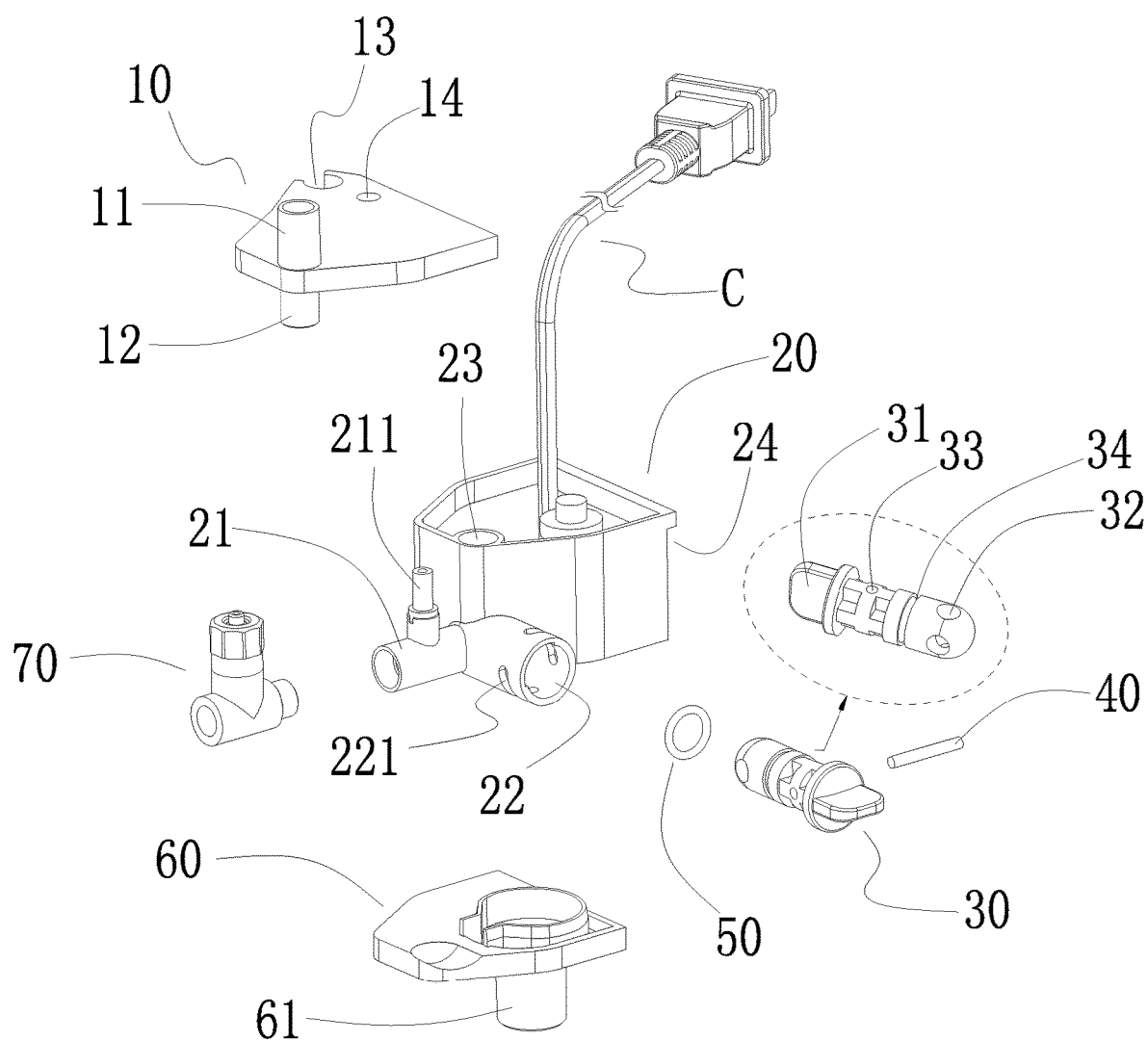
FIG. 2 is an exploded three-dimensional schematic view of the multifunctional submersible pump of the present invention.
Figure 3:
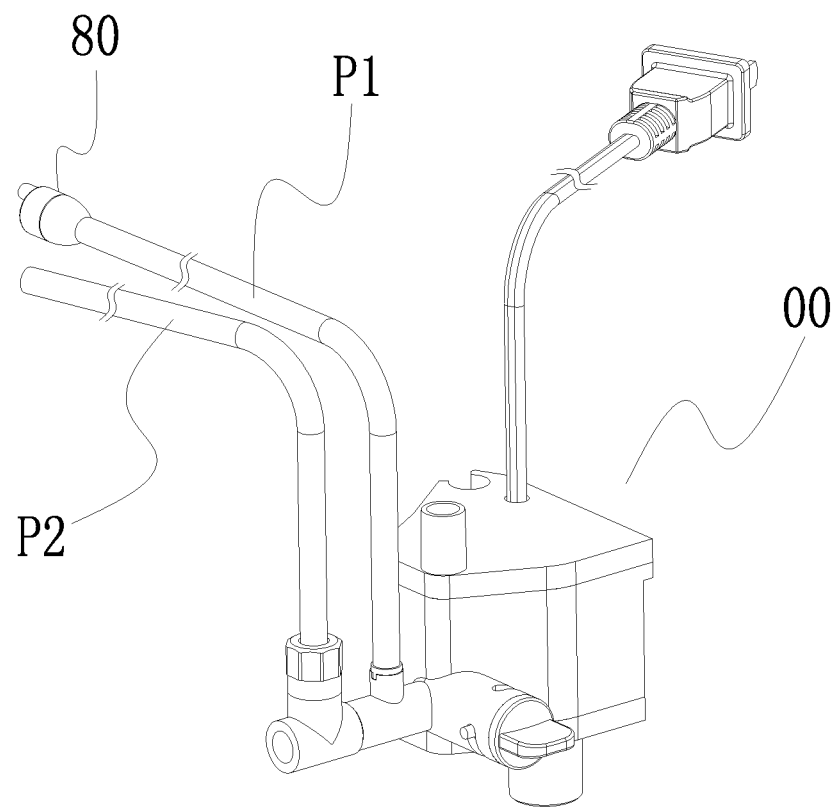
FIG. 3 is a schematic view of an oxygenation regulator and a $CO_2$(carbon dioxide) delivery flexible pipe fitted to the multifunctional submersible pump of the present invention.

Referring to FIG. 1, FIG. 2, and FIG. 3, which show three-dimensional and exploded three-dimensional schematic views of a multifunctional submersible pump 00 of the present invention that primarily comprises:

An upper cover 10, a pump body 20, an adjustment knob 30, a metal pin 40, a gasket ring 50, a lower cover 60, a simple CO2 (carbon dioxide) refiner 70, and an oxygenation regulator 80; wherein:

The upper cover 10 is used to cover the upper portion of the pump body 20. A drain outlet 11 and an upper cover pin shaft 12 are further provided on the upper cover 10, wherein the drain outlet 11 enables connecting to a drain flexible pipe, and the upper cover pin shaft 12 is mounted within a drain pipe channel 23 located on the pump body 20. An aquarium lamp retainer ring 13 enables retaining an aquarium lamp L therein (see FIG. 8A), and a power cord placement hole 14 enables a submersible pump power cord C to pass therethrough.

The pump body 20 is the nucleus of the multifunctional submersible pump 00 and includes the water pump's electronic parts; moreover, one side of the pump body 20 is provided with a water outlet 21, and a hollow cylindrical body 211 is fitted on the water outlet 21. The hollow cylindrical body 211 enables fitting an oxygenation regulator flexible pipe P1, which is connected to the oxygenation regulator 80, thereon, and another side of the pump body 20 is provided with a knob holding space 22, which is provided with slots 221 for the metal pin 40 to allow positional placement of the adjustment knob 30. The pump body is further provided with a T-shaped groove 24 that enables inserting a U-shaped suspending member 02 therein for suspending on an upper edge of an aquarium 01 to fix the multifunctional submersible pump 00 thereon (see FIG. 8A).

The adjustment knob 30 provides the function to achieve switching between water circulation and filtering and pumping out wastewater from the aquarium 01, wherein a handle 31, a T-shaped water passage opening 32, a metal pin securing hole 33, and a gasket ring positioning groove 34 are configured on the adjustment knob 30. When the handle 31 is rotated until parallel with the water outlet 21, then water circulation and filtering of the aquarium 01 is achieved. When the handle 31 is rotated until parallel with the drain outlet 11, then pumping out wastewater from the aquarium 01 is achieved.

The metal pin 40 is used to connect the adjustment knob 30 to the pump body 20, and controls rotation positioning of the adjustment knob 30.

The gasket ring 50 is fitted within the gasket ring positioning groove 34 provided in the adjustment knob 30, and facilitates smooth rotation of the adjustment knob 30.

The lower cover 60 is used to cover the bottom portion of the pump body 20, and is provided with a water inlet 61. One end of a rigid hollow pipe P3 is fitted on the water inlet 61, and the other end is connected to a bottom sand filter board component 90, which provide the function to achieve the object of bottom sand filtering or pumping out wastewater (see FIG. 6).

When the aquarium 01 is used for raising water plants, then the simple $CO_2$ refiner 70 is mounted on the end of the water outlet 21 and connected to canned $CO_2$ by means of a $CO_2$ refiner gas transfer flexible pipe P2, which enables carbon dioxide to thoroughly dissolve in the aquarium water for use by the water plants to undergo photosynthesis.

The oxygenation regulator 80 is connected to the water outlet 21 by means of the oxygenation regulator flexible pipe P1, which enables supplying the aquarium with small amounts of oxygen according to needs.

Figure 4A:
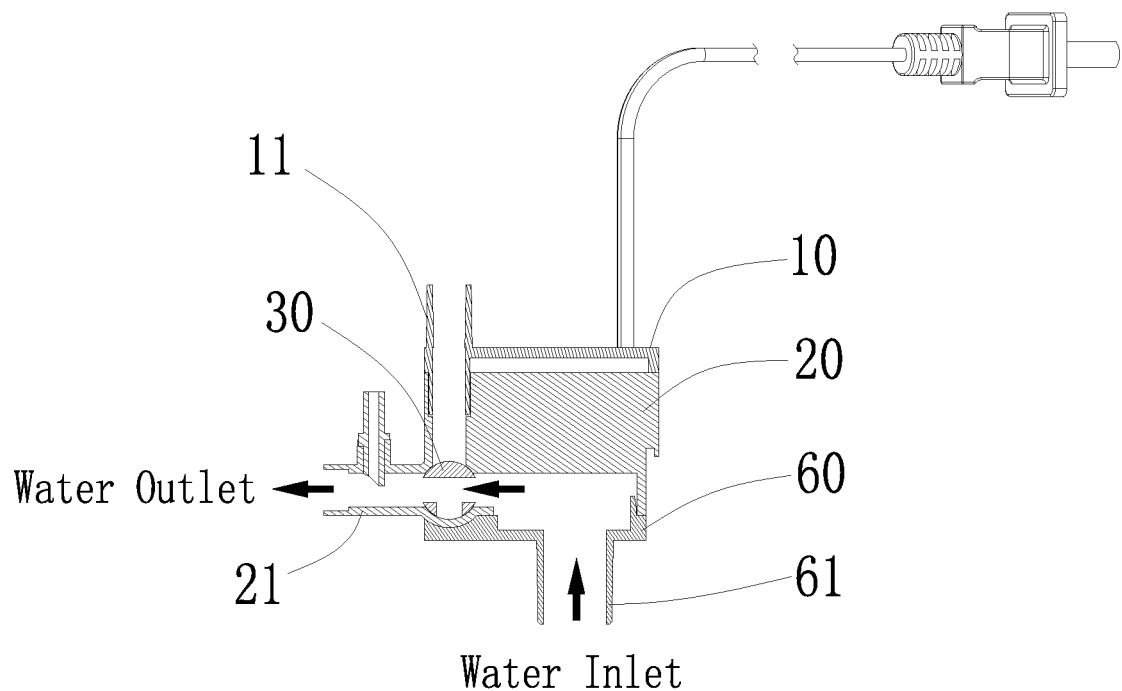
FIG. 4A is a schematic view depicting water inlet flow direction of the multifunctional submersible pump of the present invention.

Referring to FIG. 4A, which shows a schematic view clearly depicting water inlet flow direction of the multifunctional submersible pump 00 of the present invention, wherein when the handle 31 of the adjustment knob 30 is rotated until parallel with the water outlet 21, thereby allowing free flowing of water therethrough while blocking and disabling water flow through the drain outlet 11, then the object of water circulation and filtering of an aquarium is achieved.

Figure 4B:
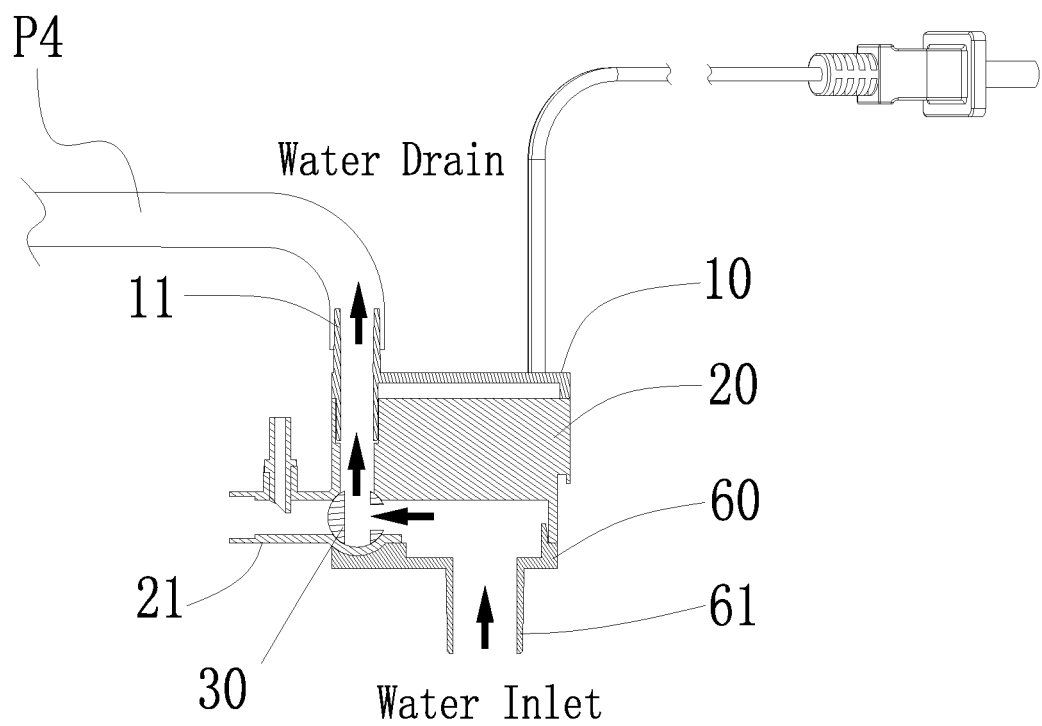
FIG. 4B is a schematic view depicting water drain direction of the multifunctional submersible pump of the present invention.

Referring to FIG. 4B, which shows a schematic view depicting water drain flow direction of the multifunctional submersible pump 00 of the present invention, wherein when the handle 31 of the adjustment knob 30 is rotated until parallel with the drain outlet 11, then water is allowed to flow freely therethrough while blocking the water circulation and filtering water outlet 21. A drain flexible pipe P4 is connected to the drain outlet 11 to provide the function to achieve the object of pumping out wastewater from an aquarium.

Figure 5:
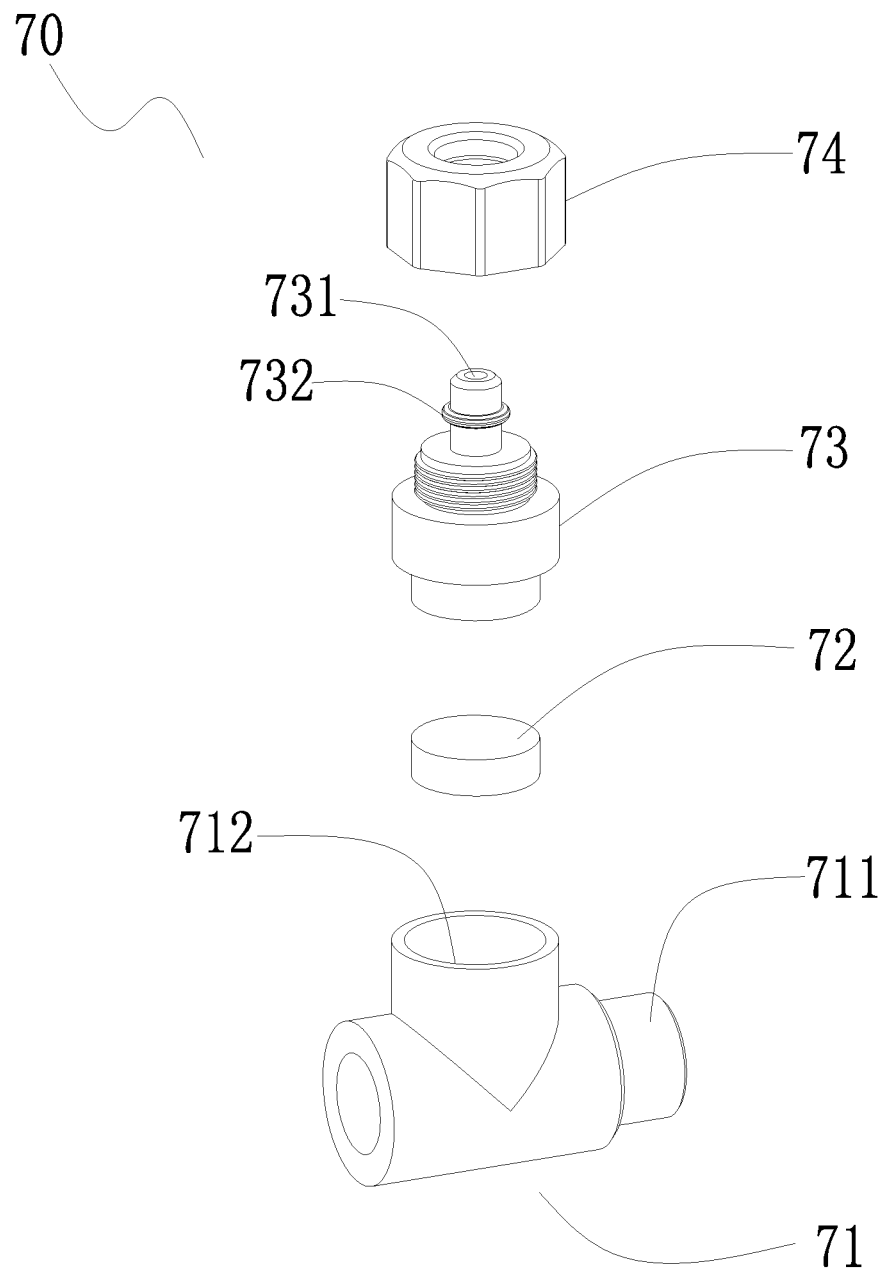
FIG. 5 is an exploded schematic view of a simple $CO_2$ refiner of the multifunctional submersible pump of the present invention.

Referring to FIG. 5, which shows an exploded schematic view of the simple $CO_2$ refiner 70 of the multifunctional submersible pump 00 of the present invention, comprising:

A water passage pipe 71, which is provided with a side end shaft hole 711, that is fitted to the end of the water outlet 21, and an upper end shaft hole 712, which enables disposing a ceramic refining disk 72 and a fastening member 73 therein.

The fastening member 73 is used to press fit the ceramic refining disk 72, and the interior thereof is provided with a through hole 731 that enables channeling $CO_2$ into the aquarium water. The fastening member 73 is further provided with a pin shaft 732 that enables fitting the $CO_2$ refiner gas transfer flexible pipe P2 thereon.

A cap 74, which is screwed onto the fastening member 73 using a screw thread method, enables tightly fitting the $CO_2$ refiner gas transfer flexible pipe P2 onto the fastening member 73, which prevents the $CO_2$ refiner gas transfer flexible pipe P2 from coming loose and avoids hazardous leakage of $CO_2$.

Figure 6:
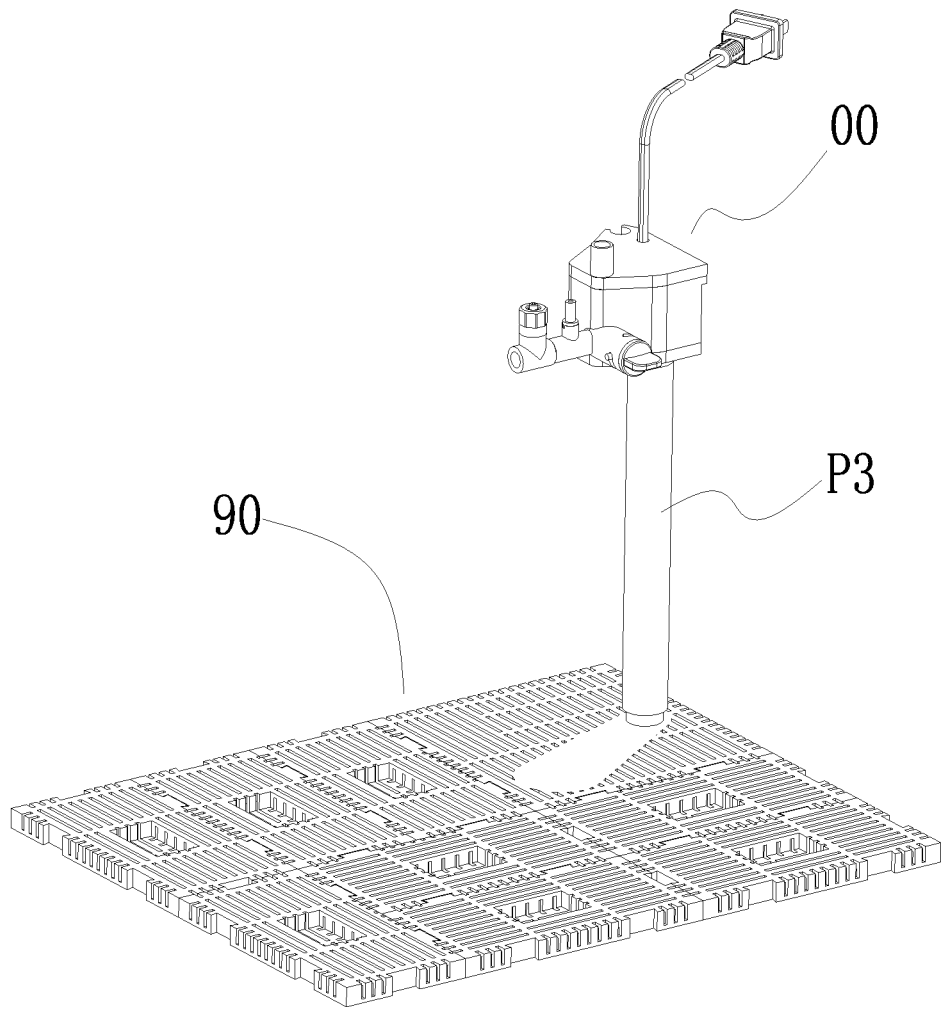
FIG. 6 is a three-dimensional schematic view depicting a water pump connected to a bottom sand filter board component by means of a rigid hollow pipe according to the multifunctional submersible pump of the present invention.
Figure 7:
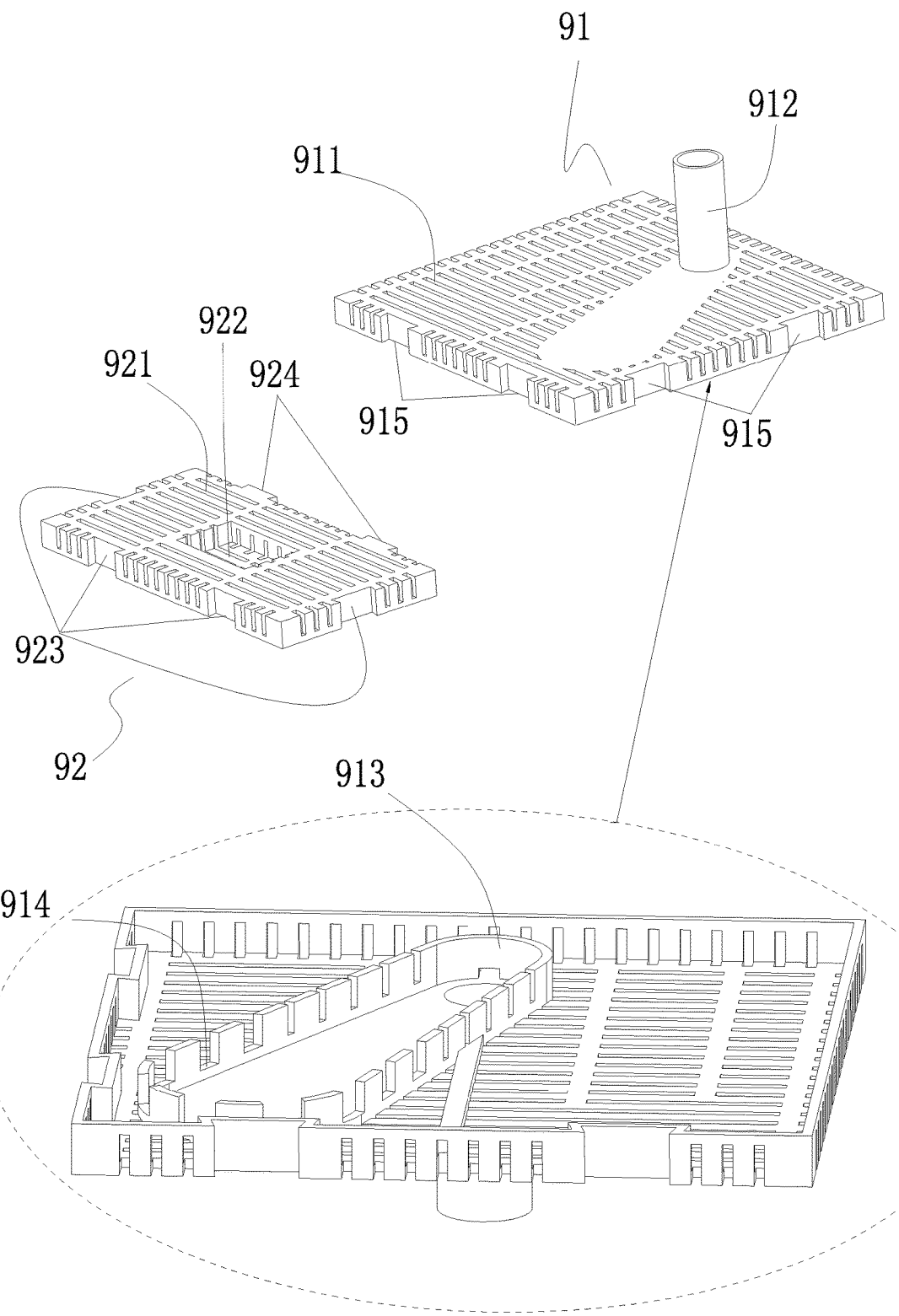
FIG. 7 is an exploded three-dimensional schematic view of two components of the bottom sand filter board component of the multifunctional submersible pump of the present invention.

Referring to FIG. 6, which shows a three-dimensional schematic view depicting the multifunctional submersible pump 00 connected to the bottom sand filter board component 90 by means of the rigid hollow pipe P3 according to the present invention, wherein the bottom sand filter board component 90 is assembled from a rigid hollow pipe fixing member 91 and a plurality of bottom sand small assembly filter boards 92 (see FIG. 7).

Figure 8A:
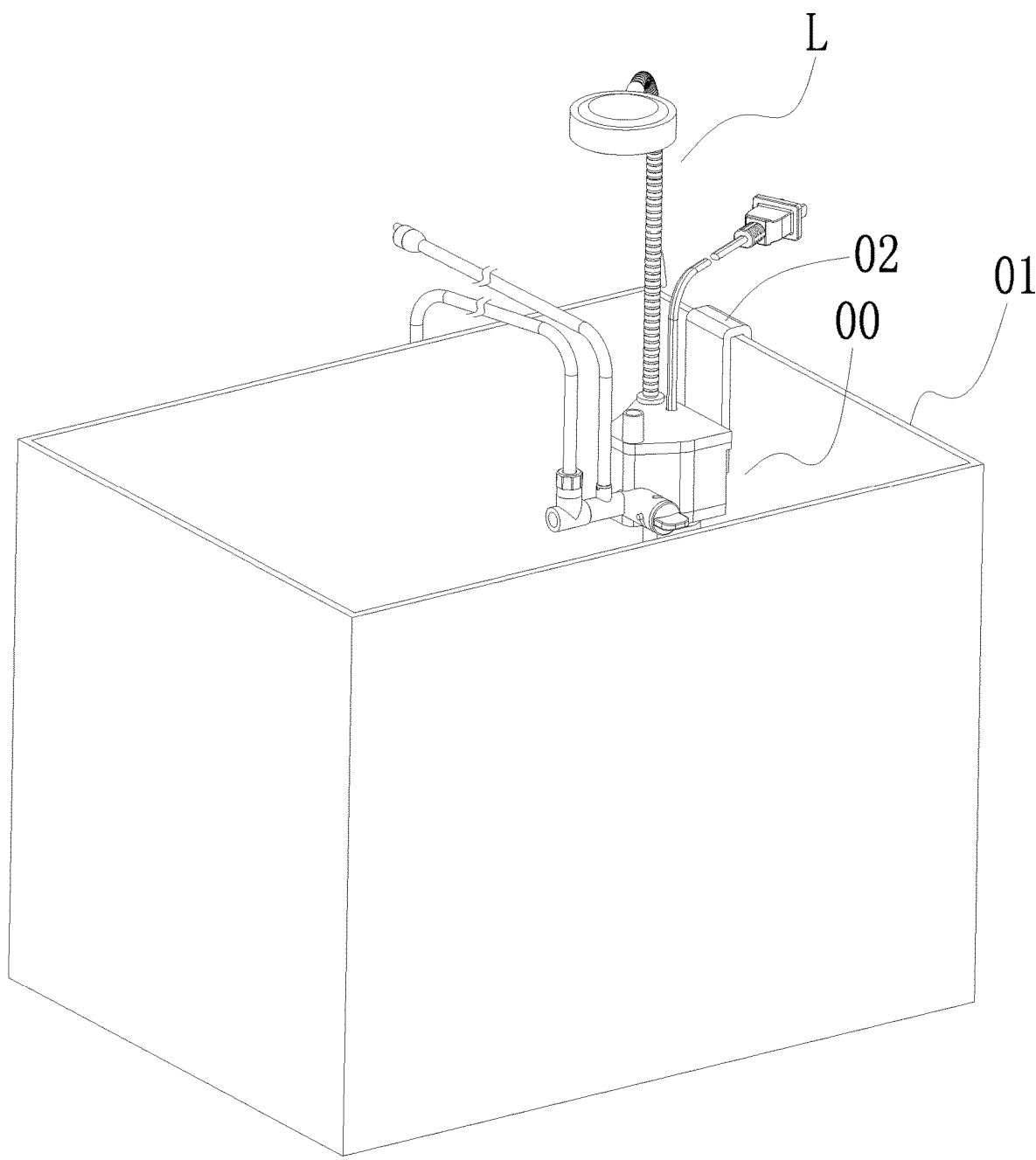
FIG. 8A is a three-dimensional schematic view the multifunctional submersible pump together with the bottom sand filter board component and other related fittings disposed in an aquarium for use thereof according to the present invention.

Referring to FIG. 7 and FIG. 8A, which respectively show three-dimensional exploded views of the rigid hollow pipe fixing member 91 of the bottom sand filter board component 90 and one of the bottom sand small assembly filter boards 92, and the multifunctional submersible pump together with the bottom sand filter board component 90 and other related fittings disposed in the aquarium 01 for use according to the present invention, wherein:

The rigid hollow pipe fixing member 91 is provided with a plurality of fixing member water permeable holes 911, which enable water inside an aquarium to permeate through to the bottom portion through bottom sand. Installation of a hollow pipe fixing column 912 enables mounting the rigid hollow pipe fixing member 91 thereon, and the height of the rigid hollow pipe P3 mounted on the hollow pipe fixing column 912 enables adjusting the height of the multifunctional submersible pump 00 within the aquarium 01 to accommodate small differences in the height of different aquariums. A barrier 913 is fitted in the interior of the rigid hollow pipe fixing member 91; moreover, the circumferential wall of the barrier 913 is provided with a plurality of water passage openings 914. The water passage openings 914 range from large to small in size, thereby preventing only pumping out water surrounding the hollow pipe fixing column 912 (pumping hole) when the multifunctional submersible pump 00 is pumping water, which would otherwise make it difficult to achieve a bottom sand filtering effect on water in other portions of the aquarium. Two sides of the rigid hollow pipe fixing member 91 are provided with a plurality of slots 915, which enable clasping protruding supports 924 configured on the bottom sand small assembly filter boards 92 when assembled together.

The bottom sand small assembly filter boards 92 are each provided with a plurality of water permeable holes 921 and a plurality of water plants pot fixing indentations 922 for placing water plants pots therein. The side walls of each of the bottom sand small assembly filter boards 92 are respectively provided with a plurality of clasping grooves 923 and the plurality of protruding supports 924. Configuration of the clasping grooves 923 and the protruding supports 924 enable mutual clasping with the plurality of bottom sand small assembly filter boards 92 to assemble different sized bottom sand filter boards, thereby satisfying the needs for different sized aquariums.

Figure 8B:
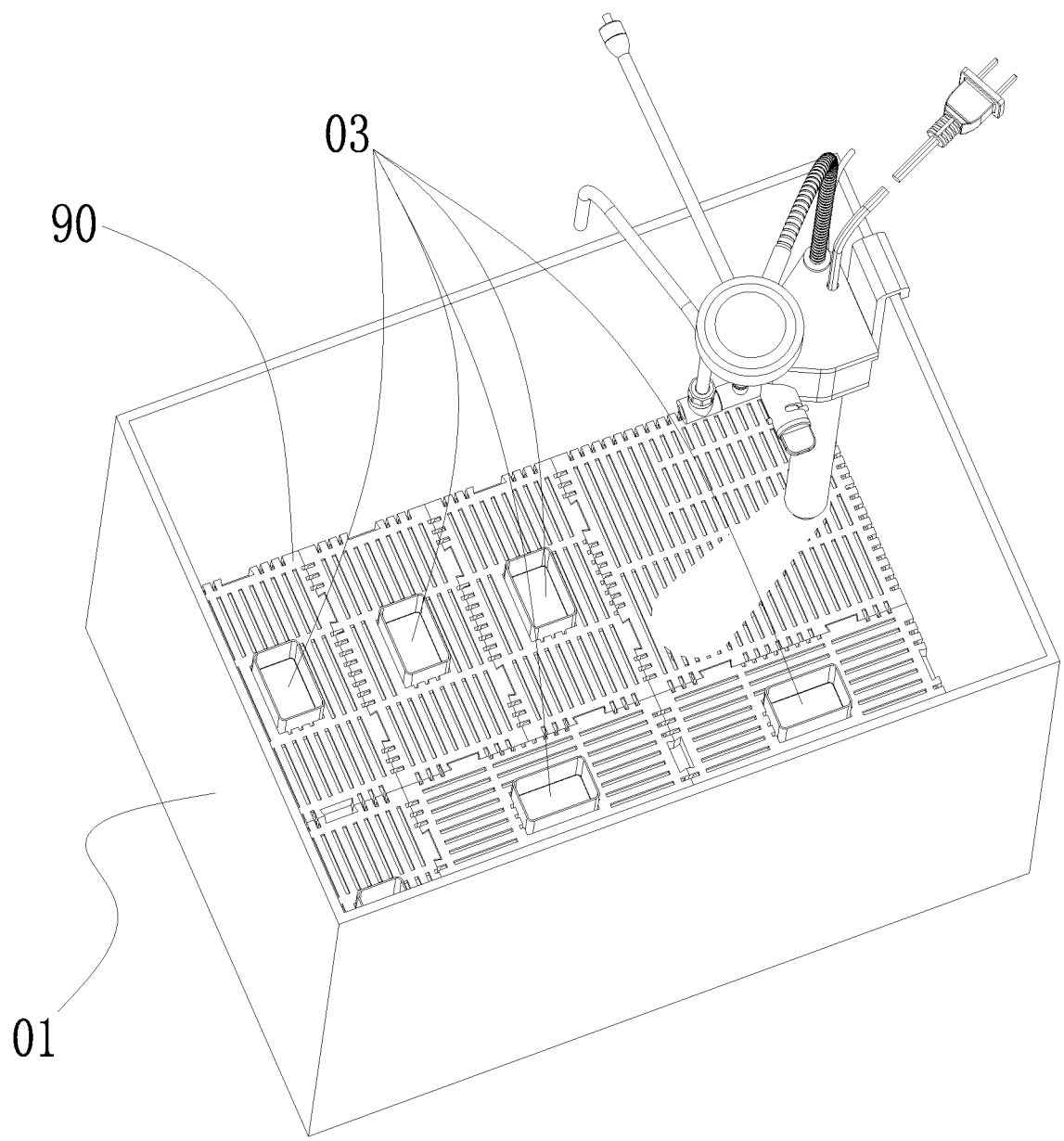
FIG. 8B is another three-dimensional schematic view of the multifunctional submersible pump together with the bottom sand filter board component and other related fittings disposed in an aquarium for use thereof according to the present invention.

Referring to FIGS. 8A and 8B, which show three-dimensional schematic views of the multifunctional submersible pump 00 paired with the bottom sand filter board component 90 according to the present invention applied together with an aquarium lamp L placed in the medium/small scale aquarium 01, wherein a plurality of water plants pots 03 are placed within the water plants pot fixing indentations 922 in the bottom sand small assembly filter boards 92, which enable cultivating water plants using the water plants pots 03 while preventing the water plants from separating from the bottom sand, and thus facilitating growth of the water plants.

Figure 9:
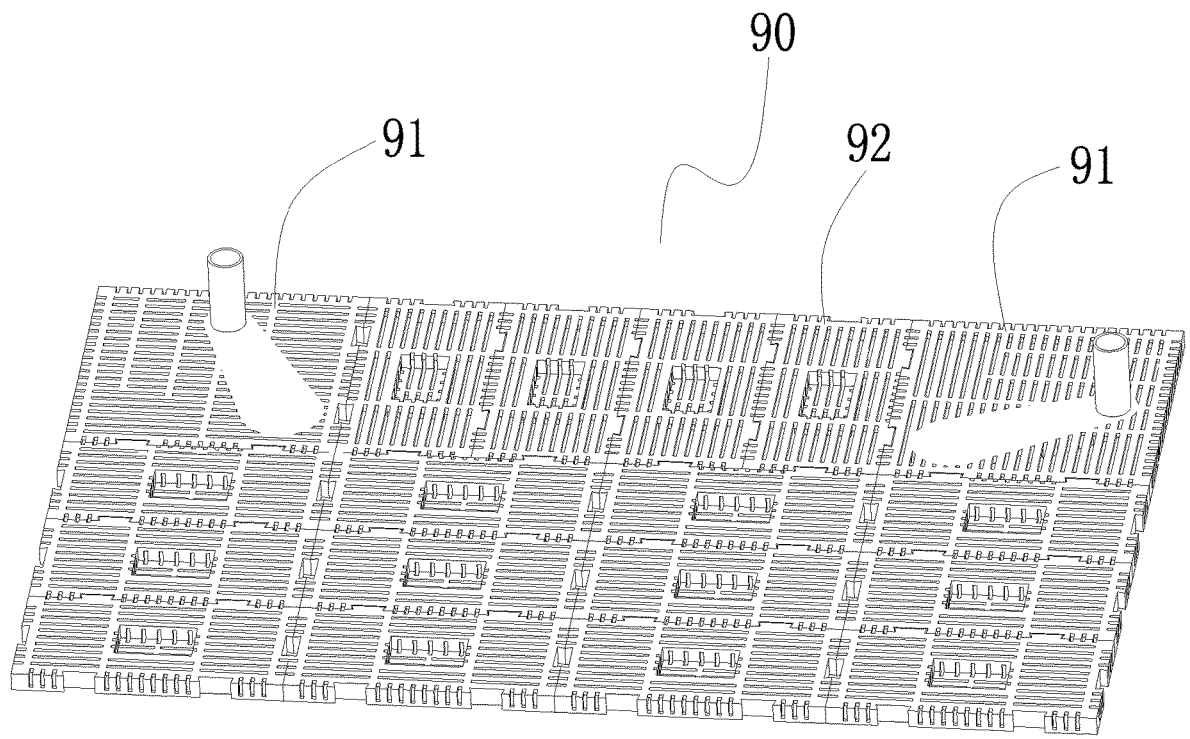
FIG. 9 is an assembled schematic view of the bottom sand filter board component of the multifunctional submersible pump match of the present invention.

Referring to FIG. 9, which shows another assembly method of the bottom sand filter board component 90, wherein the assembly method thereof is suitable for use within a relatively larger aquarium 01 and uses two of the rigid hollow pipe fixing members 91 respectively disposed on two sides of the aquarium 01, a plurality of the bottom sand small assembly filter boards 92 are then clasped thereto. Such an assembly method is used in conjunction with two of the multifunctional submersible pumps 00; however, the assembly method of the bottom sand filter board component 90 is not limited to this, and other assembly methods are also viable but not further detailed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A multifunctional submersible pump, comprising: an upper cover, which is provided with a drain outlet for wastewater, having a drain flexible pipe connected thereto, and an aquarium lamp retainer ring, which enables retaining an aquarium lamp therein; a pump body, which is provided with a water outlet for water circulation filtering use, and an adjustment knob; a lower cover, which is provided with a water inlet, having a rigid hollow pipe fitted thereon, and the water inlet is connected to a bottom sand filter board component through the rigid hollow pipe to provide the functions to achieve aquarium water circulation and pumping out wastewater; a CO2 (carbon dioxide) refiner, which is fitted to the end of the water outlet and further connected to canned CO2 to enable increasing the CO2 content in the aquarium water according to actual needs of the aquarium; an oxygenation regulator, which is fitted to the water outlet to enable increasing the oxygen content in the aquarium water according to actual needs of the aquarium.

2. The multifunctional submersible pump according to claim 1, wherein the adjustment knob on the pump body provides the function to control switching between water circulation and filtering or pumping out wastewater.

* * * * *